United States Patent [19]

Hashida et al.

[11] Patent Number: 5,181,534
[45] Date of Patent: Jan. 26, 1993

[54] FLOW CONTROL VALVE

[75] Inventors: Koichi Hashida; Koji Takata, both of Itami, Japan

[73] Assignee: Sumitomo Electric Industries, Ltd., Osaka, Japan

[21] Appl. No.: 858,517

[22] Filed: Mar. 27, 1992

Related U.S. Application Data

[63] Continuation of Ser. No. 640,624, Dec. 21, 1990, abandoned.

[30] Foreign Application Priority Data

Dec. 21, 1989 [JP] Japan ................... 1-333583
Feb. 8, 1990 [JP] Japan ................... 2-31198

[51] Int. Cl.$^5$ ............................................. G05D 7/01
[52] U.S. Cl. ................................... 137/501; 137/504
[58] Field of Search .............. 137/501, 503, 504, 505.14

[56] References Cited

U.S. PATENT DOCUMENTS

| | | | |
|---|---|---|---|
| 2,224,216 | 12/1940 | Coberly | 137/504 |
| 2,487,520 | 11/1949 | Brown | 137/503 X |
| 3,820,558 | 6/1974 | Mueller | 137/501 X |
| 4,265,270 | 5/1981 | Satoh | 137/505.14 X |
| 4,637,429 | 1/1987 | Dietiker et al. | 137/505.14 |
| 4,776,367 | 10/1988 | Hilmersson et al. | 137/501 |

FOREIGN PATENT DOCUMENTS

| | | | |
|---|---|---|---|
| 912520 | 4/1954 | Fed. Rep. of Germany | 137/505.14 |
| 48-4346 | 2/1973 | Japan | 137/501 |

*Primary Examiner*—Stephen M. Hepperle
*Attorney, Agent, or Firm*—Wenderoth, Lind & Ponack

[57] ABSTRACT

A flow control valve includes a sleeve formed with an inlet port and an outlet port and a spool slidably mounted in the sleeve. A fluid passage having an orifice connects a high-pressure end and a low-pressure end of the spool. An annular seal is liquid-tightly fitted in an annular groove formed in the inner periphery of the sleeve and extends into an annular groove formed in the outer periphery of the spool with a gap left therebetween. A biasing elements is provided to bias the spool in a direction opposite to the direction in which the fluid pressure differential between both ends of the spool tends to urge the spool. A seal can be effected by the annular seal and a shoulder portion of the spool defining the annular groove thereof. The seal, however allows fluid communication from the inlet port toward the outlet port through the orifice to be established with the movement of the spool.

9 Claims, 2 Drawing Sheets

FLOW CONTROL VALVE

This application is a continuation of now abandoned application Ser. No. 07/640,624, filed Dec. 21, 1990, now abandoned.

BACKGROUND OF THE INVENTION

This invention relates to a flow control valve suitable for use in a high-pressure, small-flow fluid pressure system which, such as a brake device for an automobile, which is operated with an especially low-viscosity hydraulic fluid.

FIG. 5 shows a prior art flow control valve in which a spool 2 is slidably mounted in a sleeve 1.

The sleeve 1 is formed with an inlet port 3 at one side thereof near its top end and with an outlet port 4 in its bottom end. An annular groove 5 is formed in the inner peripheral surface of the sleeve 1 so as to communicate with the inlet port 3 and extend over the entire circumference of the inner peripheral surface.

The spool 2 is also formed in its outer periphery with an annular groove 6 extending over the entire circumference thereof. It is further formed with a plurality of radial passages 8 interconnecting the annular groove 6 with a fluid passage 7 extending through the center of the spool 2.

The fluid passage 7 has its top end open and communicates with an upper chamber A formed in the sleeve 1. Its bottom end communicates with a lower chamber B of the sleeve 1 through an orifice 9.

A compression spring 10 serving as a biasing means is mounted in the lower chamber B in the sleeve 1 to exert an upward force on the spool 2.

In such a conventional fluid control valve, when the fluid pressure differential between both ends of the spool 2 is smaller than a predetermined value, the spool 2 will be pushed up by the spring 10 to a position where the annular grooves 5 and 6 communicate with each other. Thus in this state, fluid flows from inlet port 3 through annular groove 5, annular groove 6, radial passages 8, fluid passage 7, and orifice 9 and into the lower chamber B in the sleeve 1 and is discharged through the outlet port 4.

When the pressure of the fluid flowing into the upper chamber A in the sleeve 1 through the inlet port rises and the pressure differential between both ends of the spool 2 increases, the spool 2 will descend compressing the spring 10 under the pressure differential. As a result, the annular groove 6 will move downwards out of communication with the annular groove 5, thus breaking communication between the inlet port 3 and the upper chamber A.

When the inflow of fluid is cut off and the fluid in the upper chamber A begins to flow out through the orifice 9, the spool 2 will be pushed up by the spring 10, restoring the communication between the annular grooves 5 and 6.

By repeating this operation, the pressure differential between both ends of the spool 2 will be kept equal to the biasing force of the spring 10 divided by the sectional area of the spool. Thus, the flow rate through the orifice 9 will be set at a predetermined value because it is established by the pressure differential.

If such a conventional flow control valve is used for the brake device of an automobile, since it would operate in a low-viscosity, high-pressure line, when the annular groove 5 in the sleeve 1 and the annular groove 6 in the spool 2 are displaced from each other, fluid leakage through a gap formed between the walls separating the grooves 5 and 6 would tends to occur to such a degree as not to be negligible. Thus, the displacement between the annular grooves 5 and 6 for the spool to attain a balanced position will grow so large that the position of the spool 2 will be unstable. This makes it necessary to use an urging means having a longer stroke.

Also, due to the fluid leakage, the actual flow rate may deviate from the target flow rate.

On the other hand, if oppositely disposed lateral holes are formed in the sleeve instead of the annular groove to reduce such fluid leakage, though the leakage can be reduced, the unbalanced force acting on the spool 2 in a diametrical direction will increase due to high fluid pressure, making it necessary to use a large spring in order to exert a correspondingly large the biasing force.

Further, since the intended flow rate is extremely small, if the biasing force is large, the orifice will have to be extremely narrow.

SUMMARY OF THE INVENTION

An object of this invention is to provide a flow control valve which can control the flow rate with high accuracy even if used in a high-pressure, low-viscosity, low-flow line.

In order to solve the above problems, according to this invention, an annular seal is liquid-tightly fitted in the annular groove formed in the sleeve. A seal effected between this annular seal and a shoulder portion of the spool can exhibit a degree of opening which is freely adjustable and fluid leakage can be prevented when this opening is closed.

With this arrangement, fluid leakage can be prevented between the sleeve and the spool when they are displaced from each other. Also, a diametrical unbalanced force will not occur as in a structure using lateral holes in place of the annular groove.

Further, the biasing means for exerting a biasing force on the spool may be an electronically and variably controllable one.

According to this invention, the annular seal is fitted in the annular groove formed in the inner periphery of the sleeve, with the inner periphery of this annular seal disposed in the annular groove formed in the outer periphery of the spool. With this arrangement, when the spool is moved due to the differential pressure between both ends of the spool and the biasing means such as springs or electromagnets, the flow control valve can be opened and closed in a controlled manner with the inner periphery of the annular seal and the shoulder portion of the spool alternately coming into contact with each other and separating from one another. Thus the flow rate can be controlled with high accuracy even with a high-pressure, low-viscosity, low-flow liquid.

Therefore, this flow control valve can be used advantageously in an electronical control device such as an antilock control of a brake assembly of an automobile.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENTS

Figure 1:
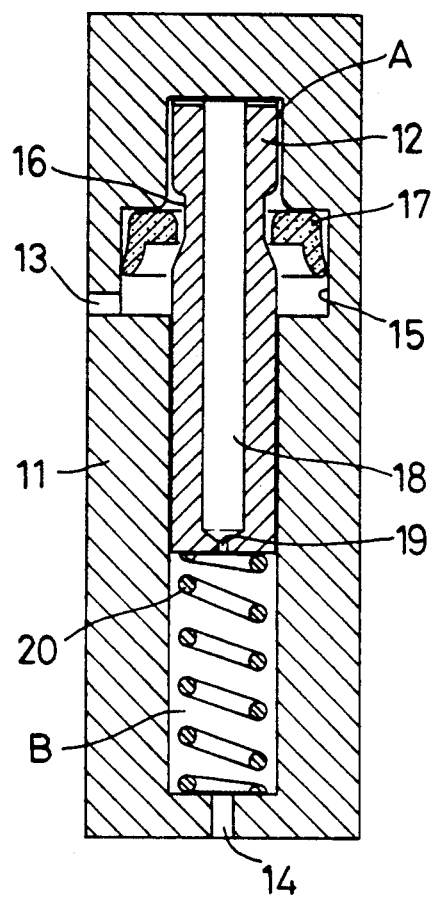
FIGS. 1 and 2 are vertical sectional views of the first embodiment of the flow control valve according to this invention in different states.
Figure 2:
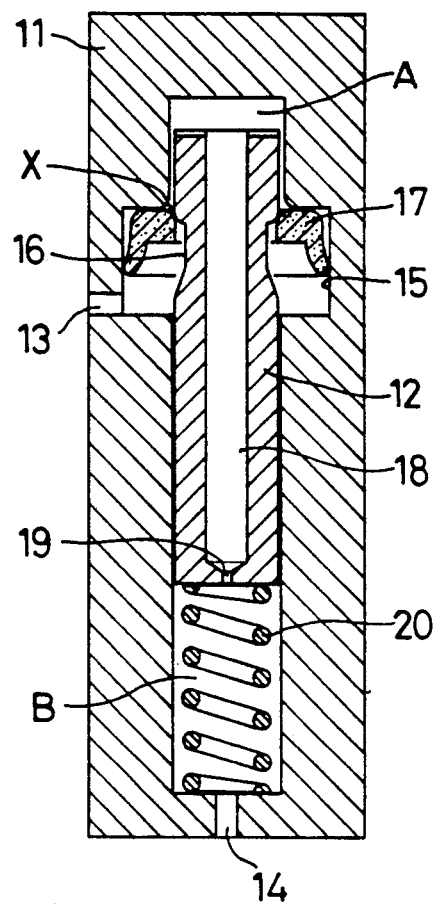

In the embodiment shown in FIGS. 1 and 2, a spool 12 is slidably mounted in the sleeve 11.

The sleeve 11 is formed near its top end at one side with an inlet port 13 and in its bottom end with an outlet port 14. Further it is formed in its inner periphery with an annular groove 15 extending over the entire circumference thereof so as to communicate with the inlet port 13.

Also, the spool 12 is formed in its outer periphery with an annular groove 16 extending over the entire circumference thereof. An annular seal 17 made of a soft resilient material is fitted in the annular groove 15 with its inner periphery received in the annular groove 16.

The annular seal 17 is formed around its outer periphery with a downwardly extending peripheral wall and is fitted liquid-tightly in the annular groove 15. When the spool 12 is in its elevated position as shown in FIG. 1, a gap is formed between the inner periphery of the seal 17 and a shoulder portion of the spool defining annular groove 16, whereas in its lowered position as shown in FIG. 2, the inner periphery of the seal 17 is pressed against the shoulder portion of the spool defining annular groove 16.

A fluid passage 18 is formed in the spool 12. It has a top opening communicating with an upper chamber A in the sleeve 11 and a bottom opening communicating with a lower chamber B through an orifice 19. The sleeve 11 has a larger inner diameter at a portion thereof above the annular groove 15 than the outer diameter of the spool 12, so that when the spool is in its elevated or retracted position (FIG. 1), a space is formed around the upper part of the spool 12 to connect the annular groove 15 in the sleeve 11 to the upper chamber A and the fluid passage 18.

A compression spring 20 serving as a biasing means is mounted in the lower chamber B in the sleeve 11 to urge the spool 12 upwardly.

In this arrangement, the differential pressure between both ends of the spool 12, i.e. both ends of the orifice 19, is determined by the force F of the spring 20 and the sectional area S of the spool, so that the flow rate can be kept at a constant value determined by the pressure F/S and the sectional area of the orifice. This will be described more specifically.

Suppose that the inlet pressure is P1, the outlet pressure is P3, and the pressure in the upper chamber A in the spool 12 is P2. When the gap between the spool 12 and the annular seal 17 is open, $P1 = P2 > P3 + F/S$. Thus the spool 12 will move downwards, closing the opening between the spool and the annular seal (at point X in FIG. 2). In this state, since $P2 > P3$, the fluid in the upper chamber A will flow through the orifice 19 toward the outlet port 14. Then the spool will move upwardly again, opening the sealing portion at the annular seal 17. This is repeated, thereby keeping the state which satisfies $P2 = P3 + F/S$. Thus the differential pressure between both ends of the orifice 19 is maintained at F/S irrespective of the P1 and P3 values, so that the flow rate through the orifice 19 is kept constant.

Any fluid leakage between the spool 12 and the sleeve 11 adds to the overall flow rate through the control valve. But such leakage can be reduced to a negligible level by increasing the length of contact between the spool and the sleeve.

Figure 5:
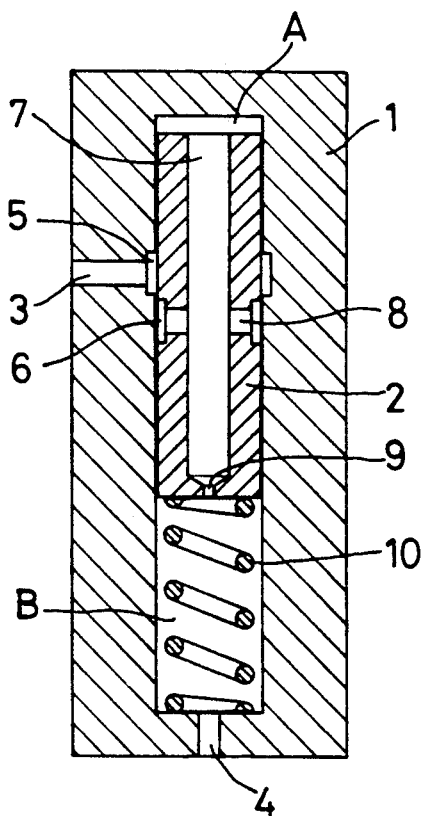
FIG. 5 is a vertical sectional view of a prior art flow control valve.

Namely, the conventional flow control valve (FIG. 5) was opened and closed by making use of the walls between the groove in the spool and the groove in the sleeve. In this invention, this portion is replaced with the sealing arrangement comprising the annular seal 17. With this arrangement, fluid leakage when the valve is in its closed position can be reduced to a negligible degree. This satisfies the operational requirements associated with the high pressure, low viscosity and low flow rate.

The sleeve 11 of the embodiment above is shown to be integrally formed. But for manufacturing and assembling purposes, it may be made up of a plurality of separable parts.

Also, a screw for adjusting the spring force may be provided.

Figure 3:
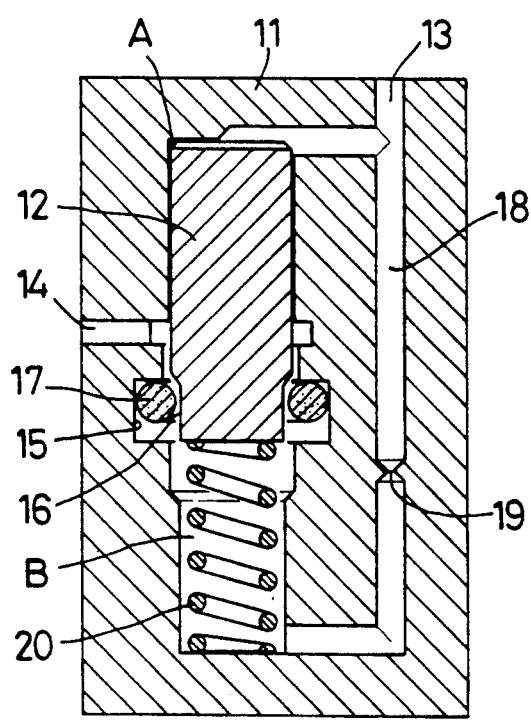
FIG. 3 is a vertical sectional view of the second embodiment.

The function of the first embodiment shown in FIGS. 1 and 2 is attainable with the structure shown in FIG. 3 in which the inlet port 13, the outlet port 14, the orifice 19 and the effective sealing surface of the annular seal 17 are provided in a reverse relation.

In the embodiment of FIGS. 1 and 2, the lower one of the pressures exerted at both ends of the spool 12, i.e. at both ends of the orifice 19, is the outlet pressure P3 whereas the higher pressure is $P3 + F/S$. In the embodiment of FIG. 3, the higher pressure is the input pressure P1 whereas the lower pressure is $P1 - F/S$. In either case, the differential pressure is F/S.

In the embodiment of FIGS. 1 and 2, the annular seal 17 has its upstream end communicating with the inlet port 13 and its downstream end communicating with the higher pressure end of the spool 12 through the gap formed between the outer periphery of the spool 12 and the inner periphery of the sleeve 11. In the embodiment of FIG. 3, the annular seal 17 has its upstream end communicating with the lower pressure end of the spool 12 and its downstream end communicating with the outlet port 14 through the space formed between the outer periphery of the spool 12 and the inner periphery of the sleeve 11. The operation of the embodiment shown in FIG. 3 will be readily understood since the parts having the same function as those in FIGS. 1 and 2 are identified by the same numerals.

Some elements of the embodiment of FIG. 3 slightly differ in design from those of FIGS. 1 and 2, thereby showing some examples of possible alternatives. One of such differences is the sectional shape of the annular seal 17. The annular seal is required to effect a seal at the annular grooves 15 in the sleeve 11 and to open and close the fluid passage formed between the inner edge portion of the sleeve defining an end of the annular groove 15 and the shoulder portion of the spool 12 at the boundary between the outer periphery of the spool 12 and its annular groove 16.

As long as the annular seal 17 provides the above two functions, it may have any desired sectional shape and may be made of any desired material. Another difference is the fluid passage 18 including the orifice 19. As long as the fluid passage 18 is provided in such a way as to connect both ends of the spool 12 with each other, it may be provided either in the spool 12 or outside of it.

Figure 4:
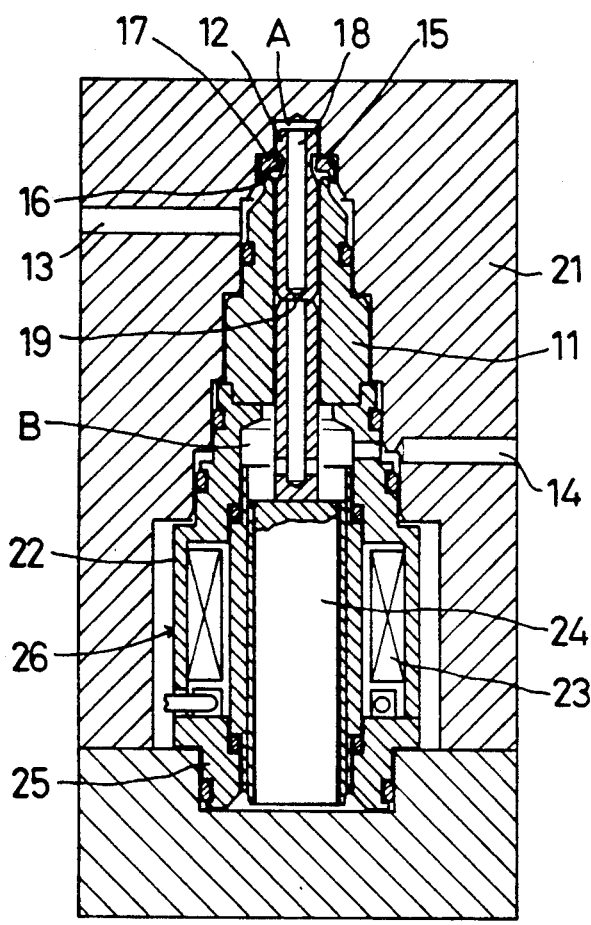
FIG. 4 is a vertical sectional view of the third embodiment.

FIG. 4 shows another embodiment in which the compression spring of the embodiments shown in FIGS. 1 and 3 is replaced with an electronically controlled variable biasing means in the form of an electromagnet. This embodiment reflects the structure of the control valve in a more practical form.

In this embodiment, the sleeve 11 is mounted in a separate housing 21 and is provided with an annular seal 17.

A frame 22 is mounted in the lower part of the housing 21. A coil 23 and an armature 24 are mounted in the frame 22 with a yoke 25 fixed to the bottom of the frame 22 to form an electromagnet 26.

By passing a current through the coil 23, a magnetic flux will be generated through the armature 24, the frame 22 and the yoke 25. As a result an upward force will act on the armature 24, urging the spool 12 upwardly in the same manner as the spring 20 in FIGS. 1 and 2.

Since the biasing force on the spool 12 can be changed freely by changing the current through the coil 23, the flow rate can be adjusted freely by remote control.

What is claimed is:

1. A flow control valve comprising:
    a sleeve defining an inlet port open at the exterior thereof, an outlet port open at the exterior thereof, and an annular groove in the inner periphery thereof;
    a spool fitted in said sleeve, said spool and said sleeve defining a high pressure chamber at one end of the spool and a low pressure chamber at the other end of the spool, said spool having a portion between the ends thereof in a liquid-tight sliding engagement with the inner periphery of said sleeve, and said spool having a shoulder portion defining an annular groove in the outer periphery thereof;
    a fluid passage having a flow restriction orifice therein and extending between said high and said low pressure chambers;
    biasing means for biasing said spool in a direction opposite to that in which a force acts on the spool when pressure in the high pressure chamber exceeds that in the low pressure chamber; and
    an annular seal of soft resilient material liquid-tightly fitted in said annular groove in the inner periphery of said sleeve, said annular seal having an inner peripheral portion extending into said the annular groove in said spool with a gap therebetween,
    fluid communication between said inlet and said outlet ports through said orifice being established through said gap when the pressure differential at said ends of the spool is less than the force exerted on the spool by said biasing means, and said shoulder portion of said spool engaging said annular seal to effect a seal against said fluid communication when said pressure differential is greater than the force exerted on the spool by said biasing means, whereby the pressure differential at said ends of the spool is maintained at a value corresponding to the force exerted on the spool by said biasing means, and the flow rate of fluid between said inlet and said output ports is maintained at a value corresponding to the flow rate through said orifice.

2. A flow control valve as recited in claim 1, wherein the annular groove in said sleeve and said annular seal fitted therein are located between said inlet port and said high pressure chamber, and said low pressure chamber directly communicates with said outlet port.

3. A flow control valve as recited in claim 1, wherein said inlet port directly communicates with said high pressure chamber, and the annular groove in said sleeve and said annular seal fitted therein are located between said low pressure chamber and said outlet port.

4. A flow control valve as recited in claim 1, wherein said biasing means is an electronic and variably controllable device.

5. A flow control valve as recited in claim 2, wherein said biasing means is an electronic and variably controllable device.

6. A flow control valve as recited in claim 3, wherein said biasing means is an electronic and variably controllable device.

7. A flow control valve as recited in claim 1, wherein said fluid passage extends through said spool.

8. A flow control valve as recited in claim 2, wherein said fluid passage extends through said spool.

9. A flow control valve as recited in claim 3, wherein said fluid passage extends through said spool.

* * * * *